US010237870B2

(12) United States Patent
Li et al.

(10) Patent No.: US 10,237,870 B2
(45) Date of Patent: Mar. 19, 2019

(54) MANAGING ORTHOGONAL FREQUENCY DIVISION MULTIPLE ACCESS UPLINK OPERATIONS

(71) Applicant: Apple Inc., Cupertino, CA (US)

(72) Inventors: Guoqing Li, Cupertino, CA (US); Joonsuk Kim, Saratoga, CA (US); Christiaan A. Hartman, San Jose, CA (US); Yong Liu, Campbell, CA (US); Chiu Ngok E. Wong, San Jose, CA (US); Syed Aon Mujtaba, Santa Clara, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 15/147,443

(22) Filed: May 5, 2016

(65) Prior Publication Data

US 2016/0330742 A1    Nov. 10, 2016

Related U.S. Application Data

(60) Provisional application No. 62/157,343, filed on May 5, 2015.

(51) Int. Cl.
*H04W 72/04*   (2009.01)
*H04L 5/00*    (2006.01)
*H04B 7/0452*  (2017.01)
*H04L 1/18*    (2006.01)
*H04W 84/12*   (2009.01)

(52) U.S. Cl.
CPC ...... *H04W 72/0453* (2013.01); *H04B 7/0452* (2013.01); *H04L 1/18* (2013.01); *H04L 5/0037* (2013.01); *H04L 5/0055* (2013.01); *H04W 84/12* (2013.01)

(58) Field of Classification Search
CPC .... H04L 5/0037–5/0042; H04L 5/0044; H04L 5/0053; H04L 5/0073; H04L 5/0094; H04W 72/0453; H04W 72/1289
See application file for complete search history.

(56) References Cited

U.S. PATENT DOCUMENTS

2012/0257606 A1* 10/2012 Sampath ............... H04L 1/0003
370/338
2016/0165589 A1*  6/2016 Chu ..................... H04L 5/0007
370/329

* cited by examiner

*Primary Examiner* — Pao Sinkantarakorn
(74) *Attorney, Agent, or Firm* — Sterne, Kessler, Goldstein & Fox P.L.L.C.

(57) ABSTRACT

Managing orthogonal frequency division multiple access (OFDMA) uplink acknowledgements is described herein. An example system can include an interface circuit to generate a physical layer convergence protocol data unit (PPDU) including a physical layer preamble, a first sub-channel field corresponding to a first station, and a second sub-channel field corresponding to a second station. The first sub-channel field can carry a first unicast trigger corresponding to the first station, and the second sub-channel field can carry a second unicast trigger corresponding to the second station. The interface circuit can also transmit the PPDU to the first and second stations.

20 Claims, 12 Drawing Sheets

300

| PHY preamble 302 | MAC trigger information 304-1 | Payload 306-1 |
| | MAC trigger information 304-2 | Payload 306-2 |
| | MAC trigger information 304-3 | Payload 306-3 |
| | MAC trigger information 304-n | Payload 306-n |

| PHY preamble 402 | MAC trigger information 304-1 | Payload 306-1 |
| | MAC trigger information 304-2 | Payload 306-2 |
| | MAC trigger information 304-3 | Payload 306-3 |
| | MAC trigger information 304-n | Payload 306-n |
| | MAC broadcast trigger 408 | |

| Reserved 502 | Trigger 504 | Other HE-control information 506 |

FIG. 5

MANAGING ORTHOGONAL FREQUENCY DIVISION MULTIPLE ACCESS UPLINK OPERATIONS

CROSS-REFERENCE TO RELATED APPLICATION

This application claims the benefit of U.S. Provisional Patent Application No. 62/157,343, filed May 5, 2015, titled "UPLINK OFDMA ACKNOWLEDGEMENT," which is hereby incorporated herein by reference in its entirety.

BACKGROUND

Technical Field

The disclosed embodiments relate to the field of wireless communications, including communicating resource units allocations in wireless communications.

Background

Generally, frames transmitted by an Institute of Electrical and Electronics Engineers (IEEE) 802.11 device have a significant amount of overhead, including radio level headers, Media Access Control (MAC) headers, interframe spacing, and acknowledgment of transmitted frames. At higher traffic conditions, this overhead can consume more bandwidth than payload of data frames.

To address this issue, the 802.11ax standard defines a broadcast trigger frame. The broadcast trigger frame is transmitted separately from and prior to data transmissions. The broadcast trigger frame enables a random access mechanism for an OFDMA transmission by multiple stations in a wireless local area network (WLAN). An access point (AP) can broadcast the trigger frame to one or more stations. After broadcasting the trigger frame, the AP transmits a downlink (DL) data transmission in accordance with the parameters specified by the trigger frame. The AP can subsequently receive uplink (UL) data transmissions, such as acknowledgement (ACK) messages or block acknowledgment (BA) messages, transmitted by one or more stations in accordance with the trigger frame parameters.

However, broadcasting the trigger frame prior to the data transmissions can add significant overhead to transmit operations. In some circumstances, the benefits gained from employing the broadcast trigger frame are outweighed by the complexity involved in computing trigger frame parameters, the amount of extra transmissions used in sending the trigger frames, and/or the time required to send this extra overhead information.

SUMMARY

The described embodiments relate to techniques for wireless communication among electronic devices, including techniques for communicating information through a wireless network (such as, but not limited to, a wireless local area network (WLAN)) (i) using multiple directed trigger frames in a single physical layer convergence protocol data unit (PPDU), or (ii) without trigger frames. The directed trigger frames are referred to as unicast trigger frames in this disclosure. The unicast trigger frames can be used during wireless communication between electronic devices in accordance with a communication protocol, such as but not limited to an IEEE 802.11 standard (which is sometimes referred to as "Wi-Fi"). For example, the aggregated frame structure may be used with IEEE 802.11ax. This communication technique can be used with a wide variety of other communication protocols, as would be understood by a person of ordinary skill in the art based on this disclosure.

In some embodiments, an interface circuit in a transmitting electronic device, such as but not limited to an AP, generates a physical layer convergence protocol data unit (PPDU) including a physical layer (PHY) preamble, a first sub-channel field corresponding to a first station, and a second sub-channel field corresponding to a second station. The first sub-channel field can carry a first data payload and a first unicast trigger corresponding to the first station, and the second sub-channel field can carry a second data payload and a second unicast trigger corresponding to the second station. The interface circuit can transmit the PPDU to the first and second stations. The unicast triggers can be in the same frame as the data frames or in separate frames. Other embodiments include N sub-channel fields respectively corresponding to N stations, where N is any integer greater than 0.

In some embodiments, an interface circuit in a transmitting electronic device, such as but not limited to a station, generates an uplink transmission that complies with a block acknowledgement scheme. The block acknowledge scheme can specify that resource units for acknowledgments are (i) allocated to occupy roughly same sized sub-channels and (ii) assigned to stations in the same order as the stations are assigned in the received downlink (DL) transmission. The DL transmission can include an indication (such as but not limited to 1 or 2 bits) that receiving stations are to comply with the block acknowledgement scheme for one or more subsequent UL transmissions.

The disclosed communication techniques can improve communication between electronic devices. For example, the disclosed communication techniques can reduce overhead, simplify signaling, improve throughput, help bound error propagation, and allow an interface circuit to plan ahead when decoding trigger information—to name a few benefits.

The preceding summary is provided for purposes of summarizing some embodiments to provide a basic understanding of aspects of the subject matter described herein. Accordingly, the above-described features are only examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying drawings are incorporated herein and form a part of the specification.

FIG. 3 is a block diagram of an example downlink (DL) physical layer convergence protocol data unit (PPDU), according to some embodiments.

FIG. 4 is a block diagram of an example DL PPDU, according to some embodiments.

FIG. 5 is a block diagram of an example control field, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, apparatus, component, circuit, and/or computer program product embodiments, and/or combinations and sub-combinations thereof, for processing—e.g., encoding, transmitting, receiving, and/or decoding—communications with or without using unicast trigger frames. For example, embodiments are applicable to orthogonal frequency-division multiple access (OFDMA) communications.

Example Communication System to Process Embodiments of OFDMA Communications

Figure 1:
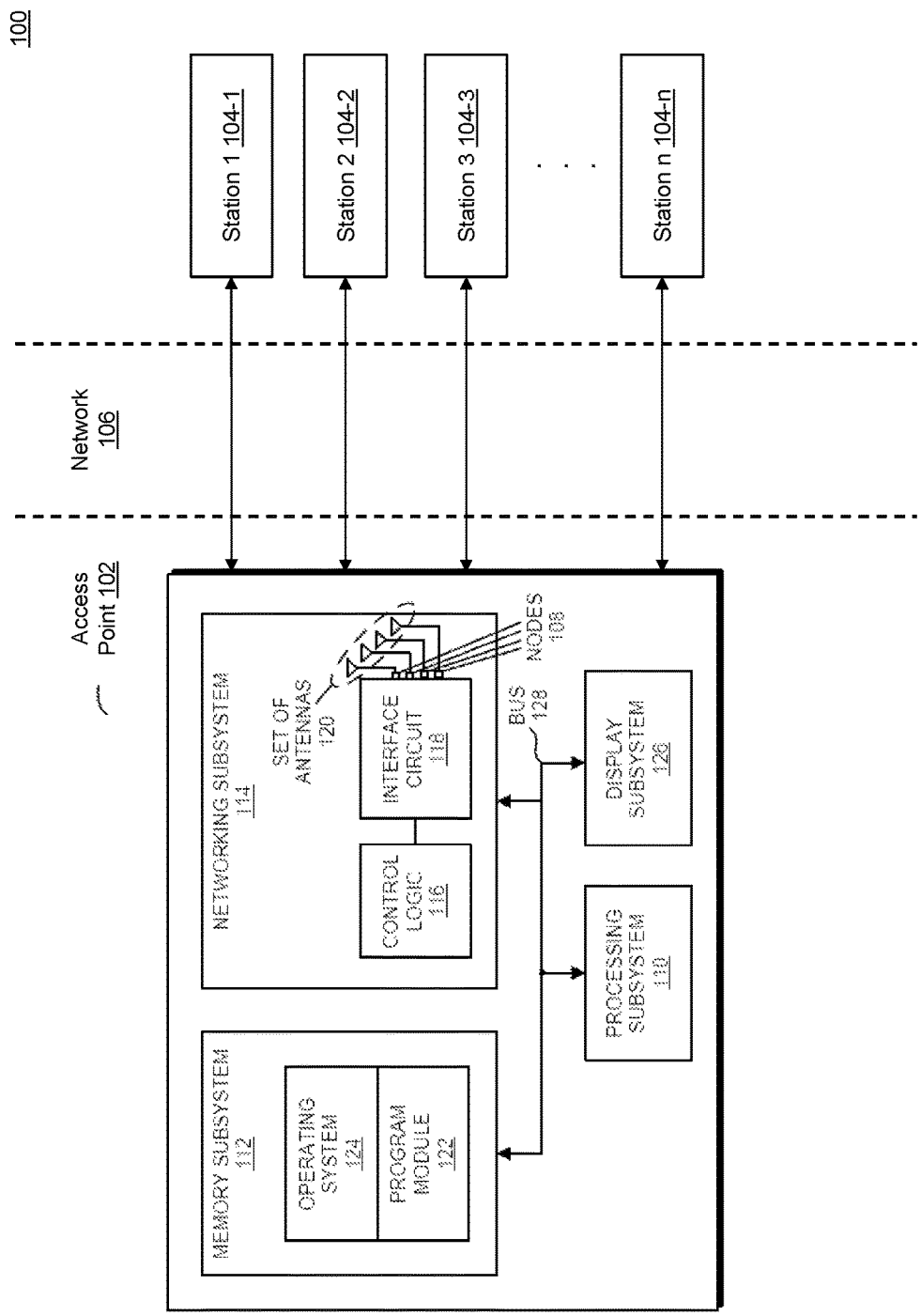
FIG. 1 is a block diagram of an example communication system, according to some embodiments.

FIG. 1 is a block diagram of an example communication system 100 for processing OFDMA communications, according to some embodiments. Communication system 100 includes access point (AP) 102, stations 104-1 through 104-n (generally stations 104), and network 106.

AP 102 includes processing subsystem 110, memory subsystem 112, and networking subsystem 114. Processing subsystem 110 includes one or more devices/components configured to perform computational operations. For example, processing subsystem 110 can include one or more microprocessors, application-specific integrated circuits (ASICs), microcontrollers, programmable-logic devices, and/or one or more digital signal processors (DSPs).

Memory subsystem 112 includes one or more devices/components for storing data and/or instructions for processing subsystem 110 and networking subsystem 114. For example, memory subsystem 112 can include dynamic random access memory (DRAM), static random access memory (SRAM), and/or other types of memory. In some embodiments, instructions for processing subsystem 110 in memory subsystem 112 include: one or more program modules or sets of instructions (such as program module 122 or operating system 124), which may be executed by processing subsystem 110. The one or more computer programs can constitute a computer-program mechanism. Moreover, instructions in the various modules in memory subsystem 112 may be implemented in a high-level procedural language, an object-oriented programming language, in an assembly or machine language, or any combination thereof. Furthermore, the programming language may be compiled or interpreted, e.g., configurable or configured (which may be used interchangeably in this discussion), to be executed by processing subsystem 110.

In addition, memory subsystem 112 can include mechanisms for controlling access to the memory. In some embodiments, memory subsystem 112 includes a memory hierarchy that comprises one or more caches coupled to a memory in AP 102. In some of these embodiments, one or more of the caches is located in processing subsystem 110.

In some embodiments, memory subsystem 112 is coupled to one or more high-capacity mass-storage devices (not shown). For example, memory subsystem 112 can be coupled to a magnetic or optical drive, a solid-state drive, or another type of mass-storage device. In these embodiments, memory subsystem 112 can be used by AP 102 as fast-access storage for often-used data, while the mass-storage device is used to store less frequently used data.

Networking subsystem 114 includes one or more devices/components configured to couple to and communicate on a wired and/or wireless network (i.e., to perform network operations), including: control logic 116, an interface circuit 118 and a set of antennas 120 (or antenna elements) in an adaptive array that can be selectively turned on and/or off by control logic 116 to create a variety of optional antenna patterns or beam patterns. Although FIG. 1 includes set of antennas 120, in some embodiments, AP 102 includes one or more nodes, such as nodes 108, e.g., a pad, which can be coupled to set of antennas 120. Thus, AP 102 may or may not include set of antennas 120.) For example, networking subsystem 114 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 114 includes processors, controllers, radios/antennas, sockets/plugs, and/or other devices used for coupling to, communicating on, and handling data and events for each supported networking system. The mechanisms used for coupling to, communicating on, and handling data and events on the network for each network system are sometimes collectively referred to as a "network interface" for the network system. Moreover, in some embodiments a network or a connection between the electronic devices does not yet exist. Therefore, AP 102 can use the mechanisms in networking subsystem 114 for performing simple wireless communication between the electronic devices, e.g., transmitting advertising or beacon frames and/or scanning for advertising frames transmitted by other electronic devices.

In AP 102, processing subsystem 110, memory subsystem 112, and networking subsystem 114 are coupled together using bus 128. Bus 128 may include an electrical, optical, and/or electro-optical connection that the subsystems can use to communicate commands and data among one another. Although only one bus 128 is shown for clarity, embodiments can include a different number or configuration of electrical, optical, and/or electro-optical connections among the subsystems.

In some embodiments, AP 102 includes a display subsystem 126 for displaying information on a display, which may include a display driver and the display, such as a liquid-crystal display, a multi-touch touchscreen, etc.

AP 102 can be (or can be included in) any electronic device with at least one network interface. For example, AP 102 can be (or can be included in): a desktop computer, a laptop computer, a subnotebook/netbook, a server, a tablet computer, a smartphone, a cellular telephone, a smart watch, a consumer-electronic device, a portable computing device, an access point, a router, a switch, communication equipment, test equipment, and/or another electronic device.

Although specific components are used to describe AP 102, in alternative embodiments, different components and/or subsystems may be present in AP 102. For example, AP 102 can include one or more additional processing subsystems, memory subsystems, networking subsystems, and/or display subsystems. Additionally or alternatively, one or more of the subsystems may not be present in AP 102. Moreover, in some embodiments, AP 102 can include one or more additional subsystems that are not shown in FIG. 1. Also, although separate subsystems are shown in FIG. 1, in some embodiments, some or all of a given subsystem or component can be integrated into one or more of the other subsystems or component(s) in AP 102. For example, in some embodiments program module 122 is included in operating system 124 and/or control logic 116 is included in interface circuit 118.

Moreover, the circuits and components in AP 102 may be implemented using any combination of analog and/or digital circuitry, including: bipolar, PMOS and/or NMOS gates or transistors. Furthermore, signals in these embodiments can include digital signals that have approximately discrete values and/or analog signals that have continuous values. Additionally, components and circuits may be single-ended or differential, and power supplies may be unipolar or bipolar.

Stations 104 may each be any electronic device such as, for example, a desktop computer, a laptop computer, a server, a media player (such as an MP3 player), an appliance, a subnotebook/netbook, a tablet computer, a smartphone, a cellular telephone, a piece of testing equipment, a network appliance, an access point, a set-top box, a personal digital assistant (PDA), a toy, a controller, a digital signal processor, a game console, a computational engine within an appliance, a consumer-electronic device, a portable computing device, a personal organizer, a sensor, a user-interface device, a router, an access point, communication equipment, or any combination thereof. Although stations 104 are shown as n stations for clarity, embodiments can include any number of stations 104.

In some embodiments, any combination of stations 104 can be similarly configured as AP 102. For example, any combination of stations 104 can include a processing system like processing subsystem 110, a memory subsystem like memory subsystem 112, a networking subsystem like networking subsystem 114, a display subsystem like display subsystem 126, or any combination thereof. Similarly, any of stations 104 can comprise any of the variations discussed herein with respect to AP 102.

AP 102 and stations 104 can communicate over network 106. Network 106 can be any network or combination of networks that support data communications. Network 106 can include, but is not limited to, a wired and/or wireless local area network, metropolitan area network, wide area network, the Internet, or any combination thereof. In some embodiments, network 106 comprises a wireless network formed by AP 102 and stations 104.

In some embodiments, interface circuit 118 of AP 102 generates a PPDU including a physical layer (PHY) preamble, a first sub-channel field corresponding to a first station 104-1, and one or more second sub-channel fields corresponding to one or more second stations 104-2 to 104-n. The first sub-channel field can carry a first data payload and a first unicast trigger corresponding to the first station, and the one or more second sub-channel fields can carry one or more second data payloads and one or more second unicast triggers corresponding to the one or more second stations 104-2 to 104-n. The interface circuit 118 can transmit the PPDU to stations 104. The unicast triggers can be in the same frame as the data frames or in separate frames.

In some embodiments, one or more interface circuits (not shown) of stations 104 generate an uplink transmission that complies with a block acknowledgement scheme. The block acknowledge scheme can specify that resource units for acknowledgments are (i) allocated to occupy roughly same sized sub-channels and (ii) assigned to stations in the same order as the stations are assigned in a received downlink (DL) transmission. The DL transmission can include an indication (such as but not limited to 1 or 2 bits) that receiving stations 104 are to comply with the block acknowledgement scheme for one or more subsequent UL transmissions.

Figure 2:
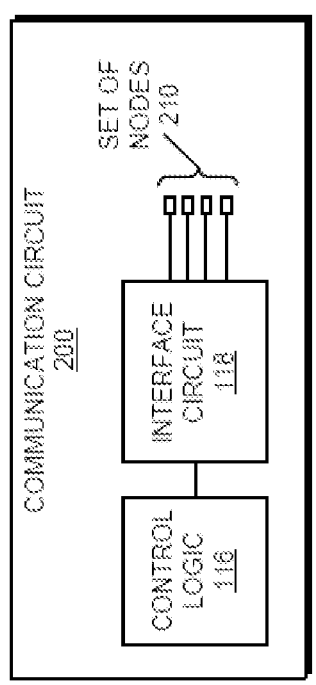
FIG. 2 is a block diagram of an example communication circuit, according to some embodiments.

FIG. 2 is a block diagram of an example communication circuit 200, according to some embodiments. Communication circuit 200 can implement some or all of the functionality of networking subsystem 114. Communication circuit 200 includes control logic 116, an interface circuit 118, and a set of nodes 210 (such as pads) that can couple to set of antennas 120.

Referring back to FIG. 1, the integrated circuit can include hardware and/or software mechanisms that are used to transmit wireless signals from AP 102 and receiving signals at AP 102 from other electronic devices, such as, for example, stations 104. Networking subsystem 114 and/or the integrated circuit can include any number of radios. In some embodiments, radios in multiple-radio configurations function in a similar way to the described single-radio embodiments.

In some embodiments, networking subsystem 114 and/or the integrated circuit include a configuration mechanism (such as one or more hardware and/or software mechanisms) that configures the radio(s) to transmit and/or receive on a given communication channel (e.g., a given carrier frequency or within a range of frequencies) and/or sub-channel. For example, in some embodiments, the configuration mechanism can be used to switch the radio from monitoring and/or transmitting on a given communication channel to monitoring and/or transmitting on a different communication channel. "Monitoring" as used herein in some embodiments comprises receiving signals from other electronic devices and possibly performing one or more processing operations on the received signals, e.g., determining if the received signal comprises a control channel, calculating an optional beam pattern, etc.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, such as, for example, Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques can be used in a variety of network interfaces. Further, although some of the operations in embodiments discussed herein can be implemented in hardware or software, in general the operations discussed herein can be implemented in a wide variety of configurations and architectures. Therefore, some or all of the operations discussed herein may be performed in hardware, in software or both. For example, at least some of the operations in the communication technique may be implemented using program module 122, operating system 124 (such as a driver for interface circuit 118) or in firmware in interface circuit 118. Alternatively or additionally, at least some of the operations in the communication technique may be implemented in a physical layer, such as hardware in interface circuit 118.

In some embodiments, communication circuit 200 generates a PPDU including a physical layer (PHY) preamble, a first sub-channel field corresponding to a first station, and one or more second sub-channel fields corresponding to one or more second stations. The first sub-channel field can carry a first data payload and a first unicast trigger corresponding to the first station, and the one or more second sub-channel fields can carry one or more second data payloads and one or more second unicast triggers corresponding to the one or more second stations. The communication circuit 200 can transmit the PPDU to the first station and one or more second stations. The unicast triggers can be in the same frame as the data frames or in separate frames.

In some embodiments, communication circuit 200 generates an uplink transmission that complies with a block acknowledgement scheme. The block acknowledge scheme can specify that resource units for acknowledgments are (i) allocated to occupy roughly same sized sub-channels and (ii) assigned to stations in the same order as the stations are assigned in a received downlink (DL) transmission. The DL transmission can include an indication (such as but not limited to 1 or 2 bits) that stations are to comply with the block acknowledgement scheme for one or more subsequent UL transmissions.

Embodiments for Managing Uplink Operations
Using Unicast Trigger Frames

Figure 6:
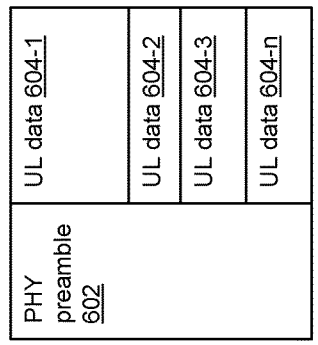
FIG. 6 is a block diagram of an example uplink (UL) PPDU, according to some embodiments.
Figure 7:
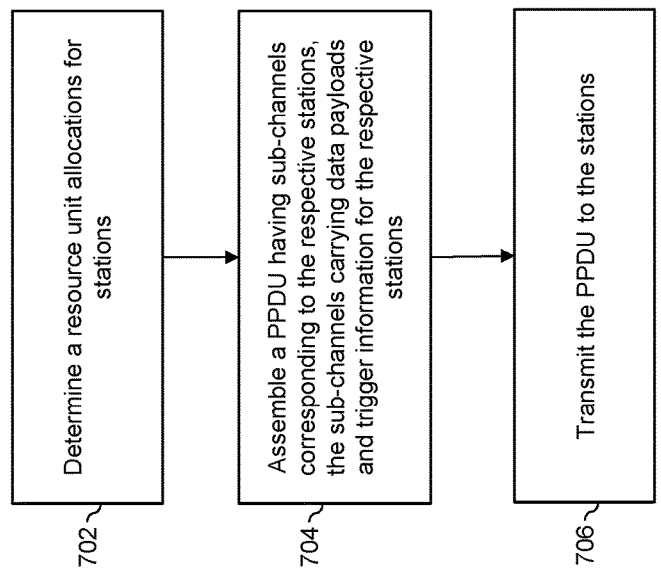
FIG. 7 is a flowchart illustrating an example method for encoding and transmitting a DL PPDU, according to some embodiments.

This section describes some embodiments for managing uplink operations using unicast trigger frames. FIGS. 3 and 4 illustrate DL PPDU embodiments that include unicast trigger frames. FIG. 5 illustrates embodiments for overriding the control fields in a MAC header. FIG. 6 illustrates UL PPDU embodiments that meet the conditions specified by the unicast trigger frames. And FIG. 7 illustrates embodiments for assembling or generating DL PPDU embodiments, such as those of FIGS. 3 and 4 for example.

FIG. 3 is a block diagram of an example DL PPDU 300, according to some embodiments. DL PPDU 300 includes physical layer (PHY) preamble 302, MAC trigger information 304-1 through 304-n (generally MAC triggers 304), and payloads 306-1 through 306-n (generally payloads 306). In some embodiments, each pair of MAC trigger information and the corresponding payload occupies a sub-channel in an OFDMA communication scheme. Although DL PPDU 300 is shown in FIG. 3 as having n MAC trigger information and payload pairs, embodiments support any number and configuration of MAC trigger information and payload pairs.

PHY preamble 302 is located at the beginning of DL PPDU 300. In some embodiments, PHY preamble 302 includes information specifying tone mapping information for the sub-channels in DL PPDU 300 (such as the frequency tones allocated to each resource unit in a sub-channel), the allocation of sub-channels to one or more corresponding stations, a pattern demarcating the beginning of DL PPDU 300, or any combination thereof. Any combination of MAC triggers 304 can be a unicast trigger and include a common parameter (e.g., the number of spatial streams across a sub-channel or a maximum number of spatial streams in each sub-channel if multiple input multiple output (MIMO) transmission is used), individual parameters (e.g., the number of spatial streams allocated to each sub-channel if MIMO transmission is used), or any combination thereof. MAC triggers 304 can specify the allocation of one or more sub-channel, such as those represented by the sub-channel fields shown in FIG. 3 or others not shown in FIG. 3, to a station. MAC triggers 304 can indicate sub-channel allocations to stations for one or more DL transmissions, one or more UL transmissions, or any combination thereof.

Any of payloads 306 can be a data field that includes data for transmission. In some embodiments, payloads 306 are physical layer convergence service data units (PSDUs) encoded in DL PPDU 300.

In some embodiments, MAC trigger information and the corresponding payload in the sub-channel field are both contained in a single frame. For example, the MAC trigger information can be located in a MAC header of the frame and the payload corresponding to the MAC trigger can be located in the payload portion of the frame. Including the MAC trigger information and the corresponding payload in a single frame instead of using a standalone MAC trigger frame can increase the amount of space available in the frame and/or the sub-channel for the payload information. Thus, the amount of payload data capable of being transmitted in the sub-channel can be increased. In some embodiments, this situation can be taken advantage of when the MAC trigger information can fit within the MAC header, such as, for example, when not much UL signaling information is required to be conveyed.

In some embodiments, MAC trigger information is a standalone frame, such as, for example, a frame separate from the corresponding payload in the sub-channel. The MAC trigger information can be a MAC frame or any frame following the 802.11 standard frame format. A payload corresponding to the standalone MAC trigger information frame can also be a standalone frame. Separating the MAC trigger information and the corresponding payload to separate frames can increase the amount of space available for the MAC trigger signaling information. Thus, complexity of the UL signaling information to be conveyed to a station can be increased.

FIG. 4 is a block diagram of an example DL PPDU 400, according to some embodiments. DL PPDU 400 includes physical layer (PHY) preamble 402, MAC triggers 304, payloads 306, and MAC broadcast trigger 408. In some embodiments, each pair of MAC trigger information and the corresponding payload and MAC broadcast trigger 408 occupies a sub-channel in an OFDMA communication scheme. Although DL PPDU 400 is shown as having n MAC trigger information and payload pairs, embodiments support any number and configuration of MAC trigger information and payload pairs. MAC triggers 304 and payloads 306 are described herein with regard to FIG. 3.

PHY preamble 402 is located at the beginning of DL PPDU 400. In some embodiments, PHY preamble 402 includes information specifying the tone mapping information associated for the sub-channels in DL PPDU 400 (such as the frequency tones allocated to each resource unit in a sub-channel), the allocation of sub-channels to one or more corresponding stations, a pattern demarcating the beginning of DL PPDU 400, or any combination thereof.

MAC broadcast trigger 408 is a broadcast trigger frame and can include a common parameter (e.g., the number of spatial streams across a channel or a maximum number of spatial streams if MIMO is used in transmissions), individual parameters (e.g., the number of spatial streams allocated to each sub-channel if MIMO is used in transmissions), or any combination thereof. MAC broadcast trigger 408 can specify the station allocation of one or more sub-channels, such as those represented by the sub-channel fields shown in FIG. 4 or others not shown in FIG. 4, to a station. MAC broadcast trigger 408 can indicate sub-channel allocations to stations for one or more DL transmissions, one or more UL transmissions, or any combination thereof.

In some embodiments, MAC broadcast trigger 408 provides trigger information to stations not identified by MAC triggers 304, and does not provide trigger information to stations identified by MAC triggers 304. For example, MAC triggers 304 can specify UL parameters for stations 104, respectively. But there could also be another station not in stations 104 that does not have corresponding MAC trigger information in DL PPDU 400 because, for example, an AP does have DL data to transmit to the other station. However, the other station may still benefit from receiving UL parameters from the AP for the situation when the other station does not have DL data to receive but has UL data to transmit. Thus, the other station would receive the UL parameters from MAC broadcast trigger 408 when PPDU 400 is transmitted by an AP and received by the stations.

FIG. 5 is a block diagram of an example control field 500, according to some embodiments. Control field 500 includes the following fields: reserved 502, trigger 504, and other HE-control information 506. In some embodiments, control field 500 includes MAC trigger information—such as the trigger information from MAC triggers 304—and is used instead of the VHT (variant HT) control field in a MAC header.

In some embodiments, reserved 502 is a single-bit long field and corresponds to the first field in the VHT control field of a MAC header. In some embodiments, when reserved 502 is set to a particular predetermined value (e.g., '1'), the VHT control field is redefined to be control field 500. Reserved 502 can indicate the presence of an HE-control header after the VHT/HT control header. Reserved 502 can indicate a reserved type and/or subtype combination to indicate the presence of a new header. In some embodiments, the PHY preamble of a PPDU (such as PHY preambles 302 or 402) indicates the presence of a new header instead of or in addition to reserved 502.

Trigger 504 specifies trigger parameters. Trigger 504 can include a sub-channel allocation of the UL PPDU for a particular station, whether to use a compressed or uncompressed UL MAC format, the transmit time of the of UL ACK (instead of or in addition to being in a PHY preamble), or any combination thereof. Specifying the trigger information in a MAC header provides at least the following benefits. First, each station does not need to know the UL OFDMA triggering information for the other stations. Second, this approach can use fewer triggering control signals than using a PHY or broadcast trigger frame. Third, inserting the trigger information into the MAC header can reduce the overhead of a standalone MAC trigger frame. Fourth, the trigger information can be present in the last MPDU of a MAC frame to improve channel estimate accuracy or in the first MPDU for pre-processing at the station. Fifth, the format of the DL and UL data exchange can be made differently and dynamically on a per-packet basis while maintaining backward compatibility with legacy stations. Sixth, a standalone MAC trigger frame can also be used and aggregated with other MPDUs.

Other HE-control information 506 can include other control information, such as information from a VHT control field of a MAC header, additional information, or any combination thereof.

FIG. 6 is a block diagram of an example UL PPDU, according to some embodiments. UL PPDU 600 includes physical layer (PHY) preamble 602 and UL data 604-1 through 604-*n* (generally UL data 604). In some embodiments, each of UL data 604 occupies a sub-channel in an OFDMA communication scheme. Although UL PPDU 600 is shown as having n UL data fields for clarity, embodiments support any number and configuration of UL data fields.

PHY preamble 602 is located at the beginning of UL PPDU 600. In some embodiments, PHY preamble 602 includes information specifying the tone mapping information for the sub-channels in UL PPDU 600 (such as the frequency tones allocated to each resource unit in a sub-channel), the allocation of sub-channels to one or more corresponding stations, a pattern demarcating the beginning of UL PPDU 600, or any combination thereof.

Any combination of UL data 604 can be a data field that includes data for transmission. In some embodiments, UL data 604 are physical layer convergence service data units (PSDUs) encoded in UL PPDU 600.

In some embodiments, one or more stations—e.g., any of stations 104—encodes UL PPDU 600 in accordance with UL parameters received from one or more trigger frames in a DL PPDU—e.g., DL PPDU 300 or 400. Any combination of UL data 604 can originate or otherwise be generated by any combination of source stations.

FIG. 7 is a flowchart illustrating an example method for encoding and transmitting a DL PPDU, according to some embodiments. Method 700 can be performed by processing logic that can include hardware (e.g., circuitry, dedicated logic, programmable logic, microcode, etc.), software (e.g., instructions run on a processing device), or a combination thereof. For example, method 700 can be performed by interface circuits 118 in FIGS. 1 and 2 and/or by computer system 1200 in FIG. 12 (described below).

At 702, resource unit allocations for stations are received, determined or otherwise accessed. In some embodiments, interface circuit 118 of AP 102 receives resource unit allocations for stations 104. The resource unit allocations for stations can specify the subset of resource units allocated to each station 104. Subsequently the bandwidth of the sub-channel used by each individual station 104 can be determined by the size and number of all resource units allocated to itself.

At 704, a PPDU having sub-channels fields corresponding to the respective stations is assembled based at least in part on the resource unit allocations. Each sub-channel field may correspond to a sub-channel comprised of one or more resource units. Each sub-channel field can carry both a data payload and trigger information for the station corresponding to the sub-channel field. In some embodiments, interface circuit 118 of AP 102 assembles the PPDU by inserting a PHY preamble at the beginning of the frame, appending trigger information and data payloads to respective sub-channel fields. The trigger information can be appended at the beginning of the frame, the end of the frame, or anywhere between. In some embodiments, the sub-channels are allocated in the PPDU in accordance with an OFDMA scheme. The PPDU can also be assembled to include sub-channel fields that do not include trigger information (e.g., neither broadcast nor unicast trigger information). In some embodiments, the assembled PPDU comprises DL PPDU 300 illustrated in FIG. 3 or DL PPDU 400 illustrated in FIG. 4.

In some embodiments, trigger information and the corresponding payload in the sub-channel field are both assembled into a single frame of the PPDU. The trigger information can be inserted in a MAC header of the frame and the payload corresponding to the MAC trigger can be inserted in the payload portion of the frame. For example, trigger information can be inserted in the MAC header of the frame as described herein with respect to FIG. 5.

In some embodiments, trigger information is assembled a standalone frame, such as, for example, a frame separate from the corresponding payload in the sub-channel field. The MAC trigger information can be a MAC frame or any frame following the 802.11 frame format. A payload corresponding to the standalone MAC trigger information frame can also be a standalone frame or combination thereof.

In some embodiments, a broadcast trigger frame specifying resource unit allocations for a plurality of stations is inserted in a separate sub-channel field of the PPDU. The plurality of stations can be completely distinct from the stations having unicast trigger information supplied in the PPDU or have any amount of overlap therewith.

At 706, the assembled PPDU is transmitted to the stations. In reference to FIG. 1, antennas 120 in AP 102 can be used to transmit the assembled PPDU to stations 104 over network 106.

In some embodiments, one or more UL PPDUs are received from one or more of stations 104 that comply with the resource unit allocations specified by the trigger frames. For example, stations 104 can transmit UL PPDUs—such as those described with respect to FIG. 6—to AP 102 over frequency ranges specified by the corresponding resource unit allocations.

Figure 8:
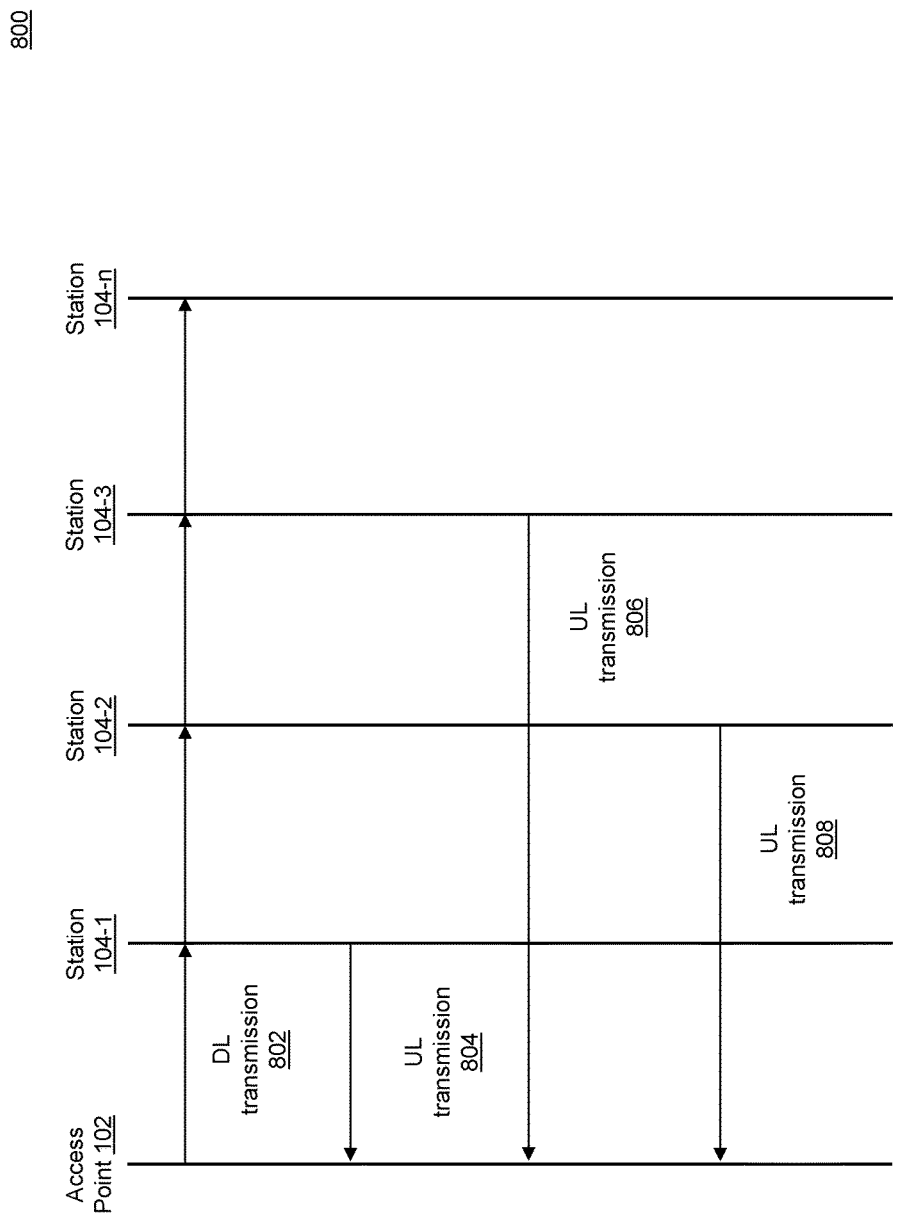
FIG. 8 is a signal flow diagram of an example communication system operating using unicast triggers, according to some embodiments.

FIG. 8 is a signal flow diagram of an example communication system 800 operating using unicast triggers, according to some embodiments. In the example of FIG. 8, communication system 800 includes AP 102, stations 104, DL transmission 802, and UL transmissions 804, 806, and 808. Although n stations 104 and four transmissions are shown, embodiments can include a different number or configuration of stations 104 and/or transmissions.

In FIG. 8, AP 102 DL transmission 802 to each of stations 104. The DL transmission includes one or more unicast triggers. In some embodiments, DL transmission 802 comprises DL PPDU 300 discussed with respect to FIG. 3 and/or DL PPDU 400 discussed with respect to FIG. 4. Although DL transmission 802 is depicted as a broadcast transmission to stations 104, embodiments can include a different number or configuration of transmissions, such as, for example, a multicast transmission, another broadcast transmission, or any combination thereof. In some embodiments, DL transmission 802 is generated and transmitted according to method 700 described with respect to FIG. 7.

In FIG. 8, stations 104 receive DL transmission 802. Each station 104 processes a PHY preamble (such as PHY preambles 302 or 402) of DL transmission 802 to determine which (if any) of one or more sub-channels in the DL transmission 802 is/are assigned to the station. The station processes the corresponding one or more sub-channels to identify a unicast trigger (such as MAC trigger information 304) carried by the sub-channel field corresponding to the respective station. The station also processes the unicast trigger to determine resource unit allocations for the station, which are specified by the respective unicast trigger.

In FIG. 8, stations 104-1, 104-2, and 104-3 transmit UL transmissions 804, 808, and 806, respectively, to AP 102. The UL transmissions 804, 806, and 808 include data allocated to resource units according to the triggers of DL transmission 802. In some embodiments, any combination of UL transmissions 804, 806, or 808 comprises UL PPDU 600 discussed with respect to FIG. 6. Although UL transmissions 804, 806, and 808 are depicted as occurring at different points in time, embodiments can include UL transmissions that occur at the same time or other overlapping periods of time. Access point 102 receives each of UL transmissions 804, 806, and 808 and processes them accordingly.

Embodiments for Managing Uplink Operations without Trigger Frames

Figure 9:
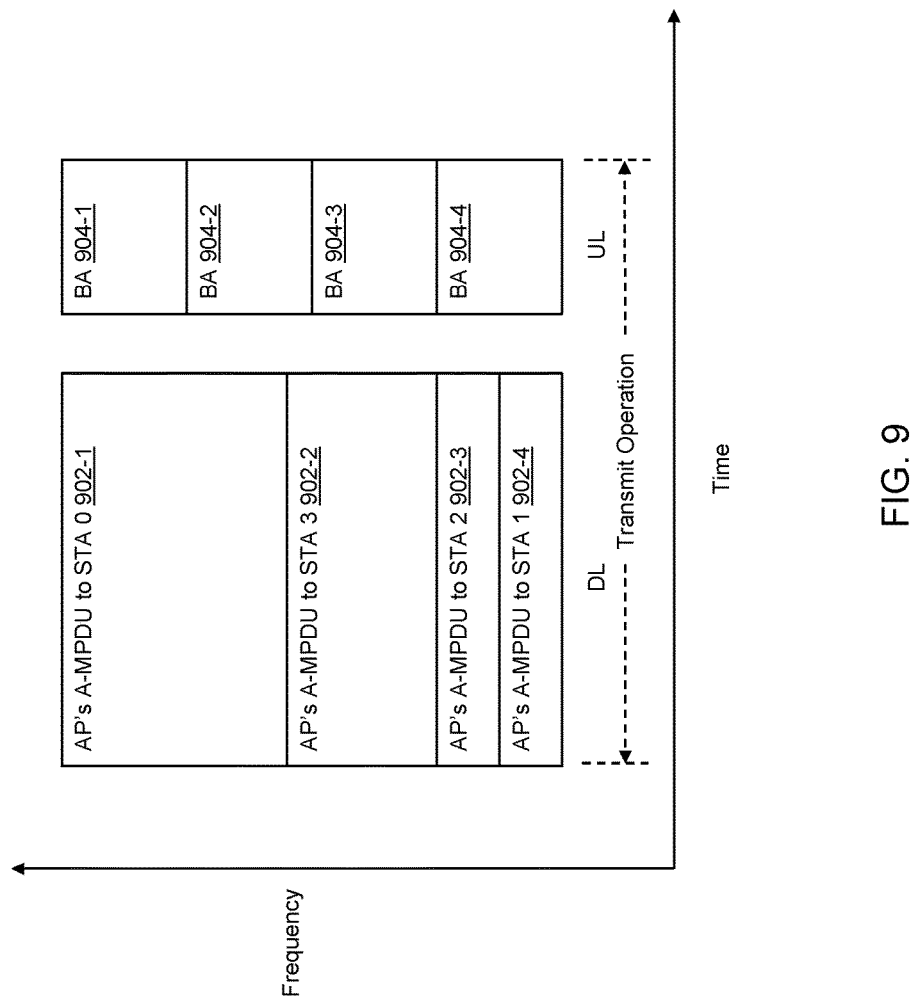
FIG. 9 is a block diagram of an example transmit operation, according to some embodiments.
Figure 10:
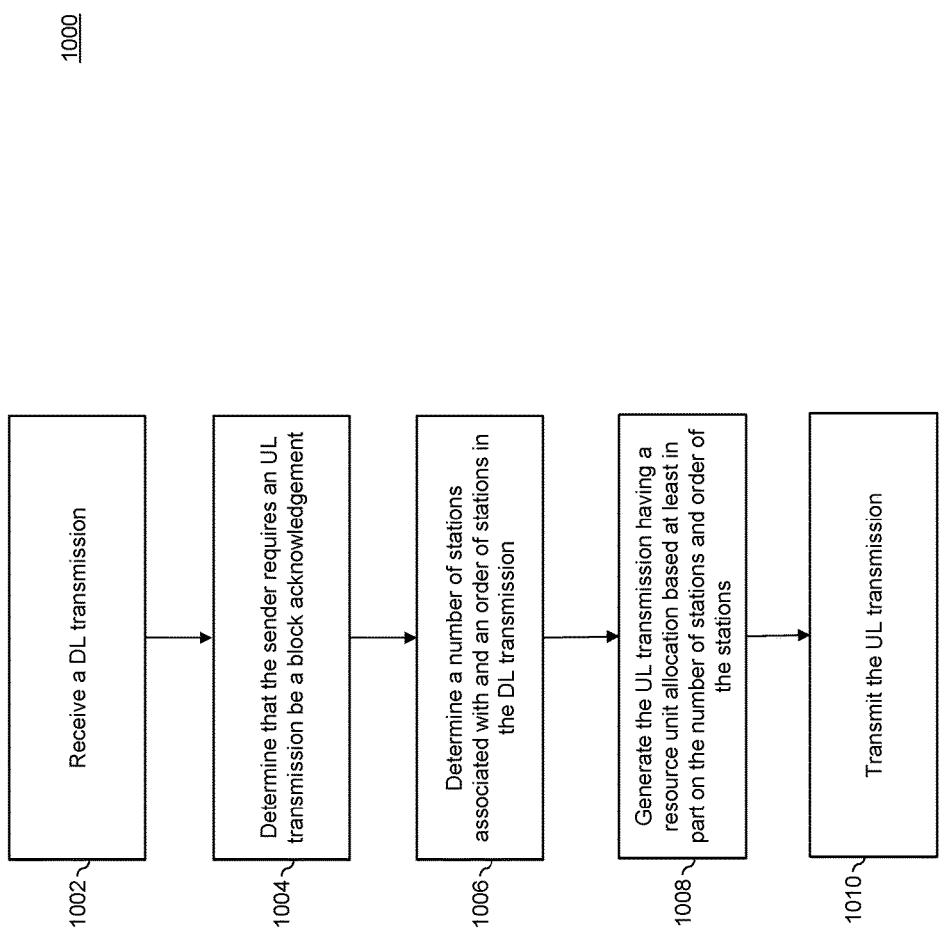
FIG. 10 is a flowchart illustrating an example method for encoding a block acknowledgement, according to some embodiments.

This section describes embodiments for managing uplink operations without using trigger frames. FIG. 9 illustrates example transmit operation and response embodiments that do not use trigger frames. FIG. 10 illustrates example embodiments for encoding a block acknowledgement, such as those of FIG. 9 for example.

FIG. 9 is a block diagram of an example transmit operation 900, according to some embodiments. Operation 900 includes A-MPDUs 902-1 through 902-4 (generally A-MPDUs 902) and block acknowledgements (BA) 904-1 through 904-4 (generally BAs 804). A-MPDUs 902 are transmitted by an AP to various stations during a DL transmission. BAs 904 are transmitted to the AP by the various stations during UL transmissions. Although four A-MPDUs 902 and BAs 904 are shown in FIG. 9, embodiments can include any number or configuration of A-MPDUs and BAs.

In some embodiments, A-MPDUs 902 each: occupy a sub-channel having a frequency bandwidth, are associated with an order in the DL transmission, and correspond to a particular station. For example, A-MPDU 902-1 may be associated with station 0, may occupy the largest frequency bandwidth in the example shown in FIG. 9, and may be the first among other stations in the order when viewing the place in the frequency spectrum when the ordering starts at the highest frequencies and goes to the lowest frequencies. In some embodiments, both the order and number of stations can be obtained from PHY preambles of each of A-MPDUs 902.

In some embodiments, BAs 904 are configured based at least in part on the number of stations involved in the DL transmission of and the order of those stations. BAs 904 may be allocated to occupy roughly the same amount of and/or sized sub-channels as one another. For example, if there are four stations in A-MPDUs 902 (Stations 0-3) and the number of resource units is a multiple of four, then each of BAs 904 can be allocated the same number of resource units, and BAs 904 will each share equal sizes of the frequency spectrum. In some embodiments, the number of available resource units in the UL transmission is not an exact multiple of the number of stations. When this occurs, the resource units can be proportionally distributed among the different number of stations with the remaining resources units. Without a trigger frame or preamble field to indicate the allocation formation, the use of the UL sub-channels may not be optimal. However, using this block acknowledgement scheme, the resource units for a UL transmission can be simply and fairly divided among the stations, which can provide better resistance to issues with smaller resource unit allocations. This block acknowledgement scheme also provides the benefit that a relatively small amount of information (e.g., 1 or 2 bits) can result in stations coordinating their behavior by following the rules of the block acknowledgement scheme.

FIG. 10 is a flowchart illustrating an example method 1000 for encoding a block acknowledgement, according to some embodiments. Method 900 can be performed by processing logic that can include hardware (e.g., circuitry, dedicated logic, programmable logic, microcode, etc.), software (e.g., instructions run on a processing device), or a combination thereof. For example, method 1000 can be performed by interface circuits 118 in FIGS. 1 and 2 and/or by computer system 1200 in FIG. 12 (described below).

At 1002, a DL transmission, such as a PDDU, is received. For example, in some embodiments, interface circuit 118 of one of stations 104 receives a DL transmission from AP 102.

At 1004, whether the sender requires an UL transmission to be a block acknowledgement is determined. For example, in some embodiments, interface circuit 118 of one of stations 104 determines that the UL transmission should be in the form of a block acknowledgement. Interface circuit 118 can determine this information from data included in the DL transmission.

In some embodiments, that the sender requires an UL transmission be a block acknowledgement is indicated in ACK policy bits of a header in the DL transmission. For example, one or more bits in a quality of service (QoS) control field in a MAC header can specify that the block acknowledgement scheme is to be used.

At 1006, (i) a number of stations associated with the received DL transmission and (ii) an order of the receiving station among the stations are determined. For example, in some embodiments, interface circuit 118 of one of stations 104 determines the number of stations and the assignment of its corresponding sub-channel in the received DL transmission. The receiving station can determine the number of stations in the DL transmission from a PHY preamble of the DL transmission, which can include resource allocation for the DL frame. Similarly, the receiving station can determine the assignment of its corresponding sub-channel in the received DL transmission from the PHY preamble of the DL transmission.

At 1008, the UL transmission having a resource unit allocation is generated based at least in part on the number of stations and the order of the receiving station in the DL transmission. For example, in some embodiments, interface circuit 118 of one of stations 104 generates the UL transmission.

In some embodiments, the resources of BA sub-channels in the UL are allocated to occupy roughly the same number of sub-channels and/or amount of bandwidth as each other. Alternatively, if the number of available resource units in the UL transmission is not an exact multiple of the number of stations, then the resource units can be proportionally distributed among the different number of stations, with the remaining resource units being randomly or arbitrarily assigned to separate sub-channels until the remaining resource units are assigned to blocks.

In some embodiments, the BAs of responding stations are assigned based on the order that the stations are allocated in the DL transmission. For example, the station corresponding to the sub-channel having the highest frequency range in the DL transmission can be allocated to the BA having the highest frequency range in the UL transmission, the next highest frequency range in the DL transmission can be allocated to the BA having the next highest frequency range in the UL transmission, and so on until all of the stations are assigned to a BA.

At 1010, the generated UL transmission—such as a PPDU or the UL transmission described with respect to FIG. 9—is transmitted. For example, in some embodiments, interface circuit 118 of one of stations 104 transmits the generated UL transmission to AP 102.

In an embodiment, the generated UL transmission includes only BAs corresponding to the station generating the UL transmission. If this behavior is followed by other stations when responding with their own respective BAs, all of the UL transmissions will be sent using non-overlapping sub-channels, which can greatly reduce the likelihood of intra-channel interference from other stations.

Figure 11:
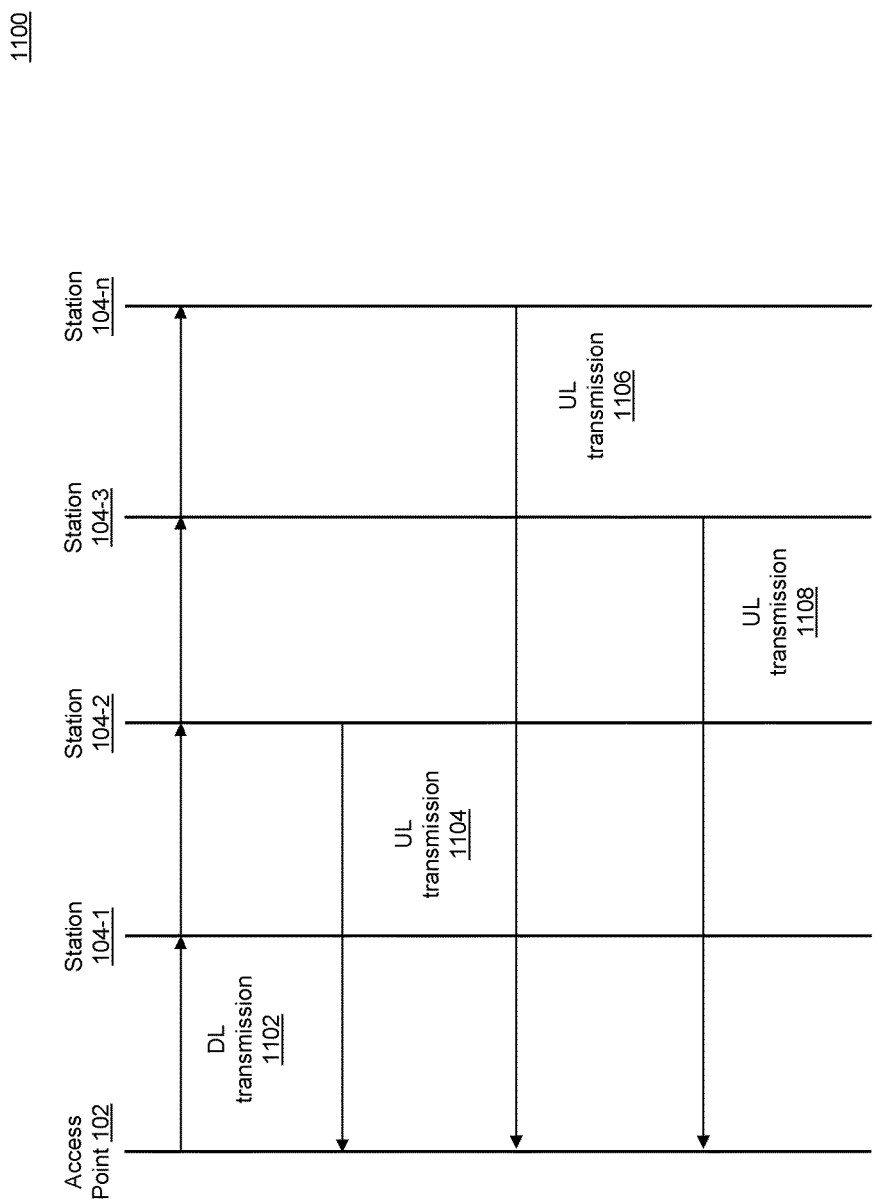
FIG. 11 is a signal flow diagram of an example communication system operating using a block acknowledgement scheme, according to some embodiments.

FIG. 11 is a signal flow diagram of an example communication system 1100 operating using a block acknowledgement scheme, according to some embodiments. In the example of FIG. 11, communication system 1100 includes AP 102, stations 104, DL transmission 1102, and DL transmissions 1104, 1106, and 1108. Although n stations 104 and four transmissions are shown, embodiments can include a different number or configuration of stations 104 and/or transmissions.

In FIG. 11, AP 102 transmits DL transmission 1102 to each of stations 104. The DL transmission 1102 includes an indication that UL transmissions are to be sent using a block acknowledgement. In some embodiments, DL transmission 1102 comprises the DL transmission discussed with respect to FIG. 9. Although DL transmission 1102 is depicted as a broadcast transmission to stations 104, embodiments can include a different number or configuration of transmissions, such as, for example, a multicast transmission, another broadcast transmission, or any combination thereof.

In FIG. 11, stations 104 receive DL transmission 1102. Each station 104 processes DL transmission 1102 to determine (i) the UL transmission is to be sent as a block acknowledgement, (ii) the number of stations associated with the DL transmission, and/or (iii) an assignment of stations in the DL transmission. Each station 104 that has information to transmit in an UL transmission (i.e., stations 104-2, 104-3, and 104-n in the example of FIG. 1100) processes the information derived from DL transmission 1102 to generate respective UL transmissions, with each UL transmission having a resource unit allocation that is generated based at least in part on the number of stations and the assignment of the receiving station in the DL transmission. In some embodiments, processing DL transmission 1102, generating the UL transmission, and transmitting the UL transmission is performed in accordance with method 1000 described with respect to FIG. 10.

In FIG. 11, stations 104-2, 104-3, and 104-n transmit UL transmissions 1104, 1108, and 1106, respectively, to AP 102. The UL transmissions include data allocated to resource units according to the block acknowledgement scheme. In some embodiments, any combination of UL transmissions 1104, 1106, or 1108 comprises the UL transmission discussed with respect to FIG. 9. Although UL transmissions 1104, 1106, and 1108 are depicted as occurring at different points in time, embodiments can include UL transmissions that occur at the same time or other overlapping periods of time. Access point 102 receives each of UL transmissions 1104, 1106, and 1108 and processes them accordingly.

Example Computer System

Figure 12:
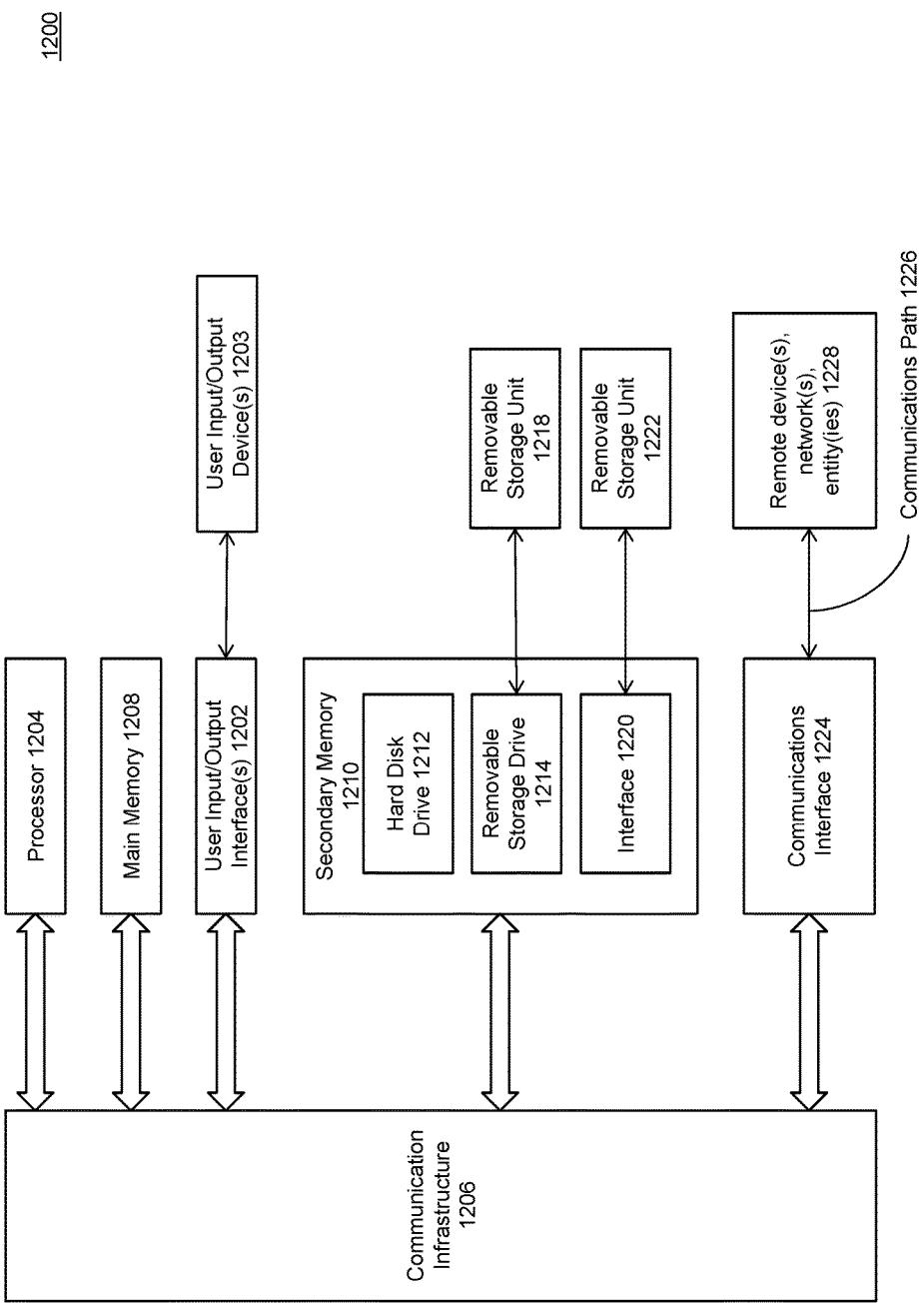
FIG. 12 is an example computer system that may be used to implement various embodiments.

Various embodiments can be implemented, for example, using one or more computer systems, such as computer system 1200 shown in FIG. 12. Computer system 1200 can be any computer capable of performing the functions described herein. For example, in some embodiments, access point 102 and/or stations 104 can be implemented using computer system 1200 or portion(s) thereof, either alone or in combination with other components (such as but not limited to antennas 120 and/or other components shown in FIGS. 1 and 2, for example).

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1008 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218.

According to embodiments, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In embodiments, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the invention using data processing devices, computer systems and/or computer architectures other than those shown in FIGS. 1, 2, and 12. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the present disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. An electronic device, comprising:
an interface circuit; and
one or more processors communicatively coupled to the interface circuit, wherein the one or more processors are configured to:
assemble a physical layer convergence protocol data unit (PPDU) comprising a physical layer preamble, a first sub-channel field corresponding to a first station, and a second sub-channel field corresponding to a second station, wherein the first sub-channel field carries a first data payload and first trigger information specifying a first resource unit allocation for the first station, wherein the first trigger information replaces at least a portion of a variant high-throughput control field of a media access control (MAC) header, and wherein the second sub-channel field carries a second data payload and second trigger information specifying a second resource unit allocation for the second station;
cause the interface circuit to transmit the PPDU to the first station and the second station; and
receive a first uplink (UL) transmission from the first station over a first frequency range specified by the first resource unit allocation and a second UL transmission from the second station over a second frequency range specified by the second resource unit allocation.

2. The electronic device of claim 1, wherein the first sub-channel and the second sub-channel are allocated in the PPDU using an orthogonal frequency division multiple access (OFDMA) scheme.

3. The electronic device of claim 1, wherein the first sub-channel field and the second sub-channel field are allocated in the PPDU using a multi-user (MU) multiple-input multiple-output (MIMO) scheme.

4. The electronic device of claim 3, wherein the first UL transmission and the second UL transmission are received using different spatial streams and using the MU MIMO scheme.

5. The electronic device of claim 1, wherein the first trigger information and the first data payload are included in a single MAC frame.

6. The electronic device of claim 1, wherein the second sub-channel field carries a broadcast trigger frame specifying resource unit allocations for a plurality of stations.

7. The electronic device of claim 6, wherein the plurality of stations comprises the second station and does not include the first station.

8. A method, comprising:
generating, by an interface circuit, a physical layer convergence protocol data unit (PPDU) comprising a physical layer preamble, a first sub-channel field corresponding to a first station, and a second sub-channel field corresponding to a second station, wherein the first sub-channel field carries a first data payload and first trigger information specifying a first resource unit allocation for the first station, wherein the first trigger information replaces at least a portion of a variant high-throughput control field of a media access control (MAC) header, and wherein the second sub-channel field carries a second data payload and second trigger information specifying a second resource unit allocation for the second station;
transmitting at least partially simultaneously, by the interface circuit, the PPDU to a plurality of stations comprising the first station and the second station; and
receiving, by the interface circuit, a first uplink (UL) transmission from the first station over a first frequency or spatial range specified by the first resource unit allocation and a second UL transmission from the second station over a second frequency or spatial range specified by the second resource unit allocation.

9. The method of claim 8, wherein the first trigger information and the first data payload are included in a combined frame.

10. The method of claim 9, wherein the generating comprises:
inserting the trigger information at a beginning MPDU of the combined frame.

11. The method of claim 9, wherein the generating comprises:
appending the trigger information at an end MPDU of the combined frame.

12. The method of claim 8, wherein the first trigger information and the first data payload are included in separate frames.

13. The method of claim 8, wherein the generating comprises:
inserting a broadcast trigger frame into the PPDU.

14. A method, comprising:
determining, by an interface circuit, resource unit allocations for a plurality of stations;
assembling a physical layer convergence protocol data unit (PPDU) having sub-channels corresponding to respective stations, wherein the sub-channels carry data payloads and trigger information for the respective stations, wherein the trigger information replaces at least a portion of a variant high-throughput control field of a media access control (MAC) header; and
transmitting the PPDU to the respective stations.

15. The method of claim 14, wherein the resource unit allocations specify a subset of resource units allocated to a first station of the plurality of stations.

16. The method of claim 15, further comprising determining a bandwidth of a sub-channel in the PPDU corresponding to the first station of the plurality of stations.

17. The method of claim 16, wherein the determining the bandwidth of the sub-channel corresponding to the first station is based at least on a size and a number of resource units allocated to the first station.

18. The method of claim 14, wherein determining the resource unit allocations comprises: receiving, by the interface circuit, the resource unit allocations.

19. The method of claim 14, further comprising receiving an uplink transmission from a first station of the plurality of stations, over a frequency range specified by the resource unit allocation determined for the first station of the plurality of stations.

20. The method of claim 14, wherein the trigger information includes parameters regarding: compressed or uncompressed uplink (UL) MAC format, or transmit time of an UL acknowledgement.

* * * * *